Feb. 28, 1939.   L. E. GOLLNICK   2,148,615
DRIVE CONNECTION FOR MOWING MACHINES
Original Filed Dec. 31, 1936
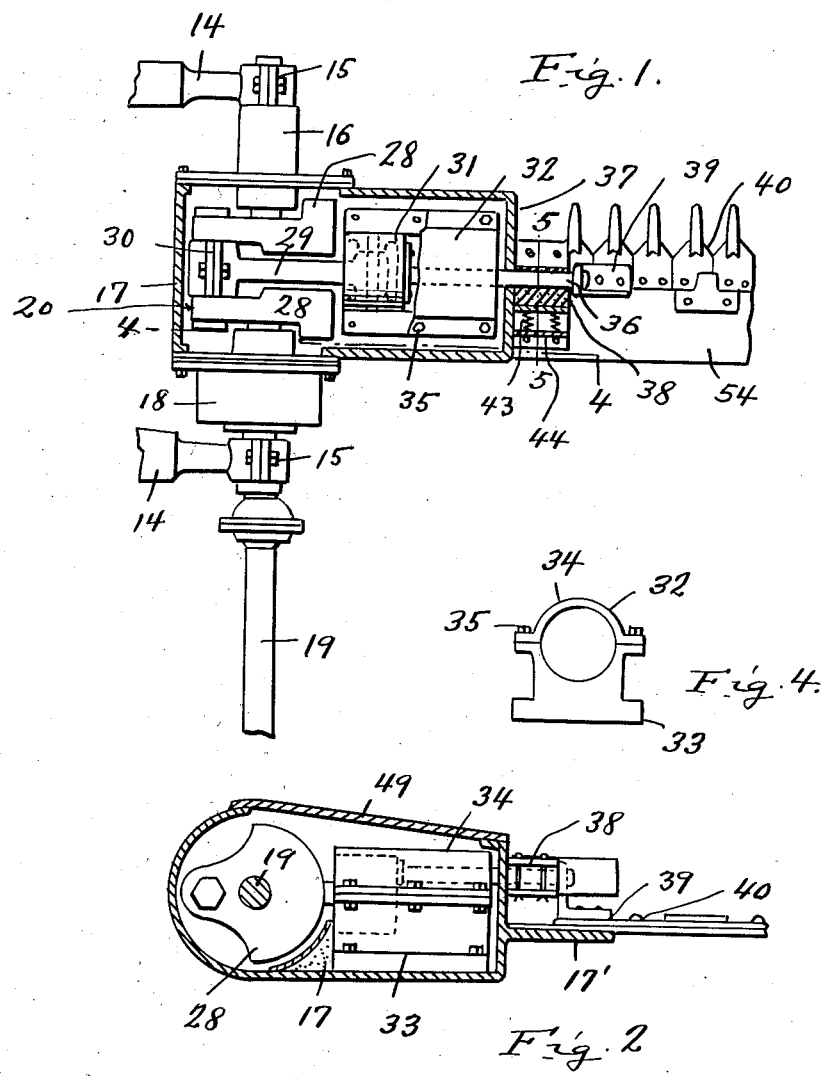
Inventor
Leonard E. Gollnick
By Clarence A. O'Brien
and Hyman Berman
Attorneys Patented Feb. 28, 1939

2,148,615

UNITED STATES PATENT OFFICE 2,148,615

DRIVE CONNECTION FOR MOWING MACHINES

Leonard E. Gollnick, Fort Pierce, Fla.

Original application December 31, 1936, Serial No. 118,655. Divided and this application March 14, 1938, Serial No. 195,897

2 Claims. (Cl. 74—44)

The present application is a division of my application for patent, Serial Number 118,665, filed December 31, 1936.

The present invention relates to mowing machines and has particular reference to the drive mechanism for the sickle bar or reciprocating blade of the machine.

One of the principal objects of the invention is to provide a drive connection between the rotating shaft and the reciprocating sickle bar of the machine which is capable of withstanding a much higher speed than is possible in the ordinary type of mowing machine and in which vibration and chattering is reduced to a minimum.

A further object is to provide a pitman drive connection of the tractor in which all the moving parts are encased within an oil reservoir.

An additional object is to provide a device of this character of simple and practical construction, efficient and reliable in performance, relatively inexpensive to manufacture and maintain in operation and otherwise well adapted for the purposes for which the same is intended.

Other objects and advantages reside in the details of construction and operation as more fully hereinafter described and claimed, reference being had to the accompanying drawing forming part hereof, wherein like numerals refer to like parts throughout and in which—

Figure 1 is a horizontal sectional view through the housing for the pitman drive connection.

Figure 2 is a sectional view taken substantially on a line 4—4 of Figure 1.

Figure 3 is a sectional view taken substantially on a line 5—5 of Figure 1.

Figure 4 is an end elevational view of the sectional cylinder for the piston of the pitman drive connection.

Referring now to the drawing in detail, wherein for the purpose of illustration I have disclosed a preferred embodiment of the invention, a pair of parallel arms 14 are positioned transversely of a tractor or the like upon which the device is mounted, the ends of the arms having brackets 15 which support trunnions 16 on the opposite sides of a housing 17, one of said trunnions 18 being hollow and within which is journaled a drive shaft 19, one end of which is operatively connected to the tractor, and the opposite end of which extends into the housing for connection to a counter-balanced pitman 20.

The pitman indicated generally at 20 is formed of a pair of spaced apart counter-balanced members 28 journaled in bearings in the respective trunnions 16 and 18 and between the members 28 is positioned a piston rod 29 connected at one end to the said members by a bearing 30. The opposite end of the piston rod carries a piston 31 slidably positioned in an open ended cylinder 32. The cylinder is provided with a base 33 bolted to the bottom of the housing 17 and the bore of the cylinder is split longitudinally to provide an adjustable and removable section 34 secured to the base portion by bolts 35.

A rod 36 is attached at one end to the piston and extends through the wall 37 of the housing and packing 38 where its opposite end is attached to a perch 39 of a reciprocating sickle blade 40. The packing 38 comprises a U-shaped housing 41 within which is slidably positioned an adjustable packing block 42 held against the rod 36 by springs 43 secured in the housing by a plate 44.

The pitman housing 17 is designed to contain a quantity of lubricating oil and is provided with a cover plate 49 for filling purposes and for adjustment and removal of the pitman and associated parts, for repairing the same.

The stationary cutter blade 54 extends outwardly from a bracket 17' carried by the housing 17, as clearly illustrated in Figure 2 of the drawing.

It is believed the details of construction and manner of operation of the device will be readily understood from the foregoing without further detailed explanation.

Having thus described the invention, what I claim is:

1. A drive connection for mowing machines comprising a housing forming an oil reservoir, a longitudinally split cylindrical guide mounted within the housing, and including a base portion fixed to the housing and a top portion, both of said portions having horizontal connecting flanges secured to each other and adapted for adjusting the diameter of the cylinder, a crosshead operable in the guide, a drive shaft operatively connected to one end of the cross-head and a sickle bar operating connecting rod attached to the opposite end of the cross-head and extending through a wall of the housing and a packing for the connecting rod outwardly of the housing.

2. A drive connection for mowing machines comprising a housing forming an oil reservoir, an open ended, longitudinally split cylindrical guide secured within the housing, means for securing the split sections of the guide together for adjusting the diameter of the guide, a cross-head operable in the guide, a drive shaft operatively connected to one end of the cross-head, a sickle bar operating connecting rod attached to the opposite end of the piston and extending through a wall of the housing, a packing for said connecting rod and spring means yieldably urging pressure transversely of the packing against the rod.

LEONARD E. GOLLNICK.